(12) United States Patent
Lin

(10) Patent No.: US 7,299,341 B2
(45) Date of Patent: Nov. 20, 2007

(54) EMBEDDED SYSTEM WITH INSTRUCTION PREFETCHING DEVICE, AND METHOD FOR FETCHING INSTRUCTIONS IN EMBEDDED SYSTEMS

(75) Inventor: Chang-Fu Lin, Hsin-Chu (TW)

(73) Assignee: MediaTek Inc., Hsin-Chu Hsien (TW)

( * ) Notice: Subject to any disclaimer, the term of this patent is extended or adjusted under 35 U.S.C. 154(b) by 0 days.

(21) Appl. No.: 11/419,202

(22) Filed: May 19, 2006

(65) Prior Publication Data

US 2006/0200630 A1 Sep. 7, 2006

Related U.S. Application Data

(63) Continuation-in-part of application No. 10/458,470, filed on Jun. 10, 2003.

(30) Foreign Application Priority Data

Jun. 12, 2002 (TW) .............................. 91112826 A

(51) Int. Cl.
*G06F 12/00* (2006.01)
(52) U.S. Cl. ..................................... 712/200
(58) Field of Classification Search ................ 712/200, 712/207, 206
See application file for complete search history.

(56) References Cited

U.S. PATENT DOCUMENTS

| | | | |
|---|---|---|---|
| 5,381,539 A | 1/1995 | Yanai | |
| 5,490,113 A | 2/1996 | Tatosian et al. | |
| 5,640,600 A * | 6/1997 | Satoh et al. | 710/33 |
| 5,778,422 A | 7/1998 | Genduso et al. | |
| 5,778,431 A * | 7/1998 | Rahman et al. | 711/135 |
| 5,805,844 A | 9/1998 | Gustin et al. | |
| 5,835,947 A | 11/1998 | Cherabuddi | |
| 5,893,921 A | 4/1999 | Bucher et al. | |
| 5,920,891 A | 7/1999 | Steinbach et al. | |
| 5,924,119 A | 7/1999 | Sindhu et al. | |
| 5,991,855 A | 11/1999 | Jeddeloh et al. | |
| 5,996,071 A | 11/1999 | White et al. | |
| 6,047,359 A | 4/2000 | Fouts | |
| 6,163,835 A | 12/2000 | Todd et al. | |
| 6,275,885 B1 | 8/2001 | Chin et al. | |
| 6,314,472 B1 | 11/2001 | Trieu et al. | |
| 6,341,334 B1 | 1/2002 | Kamemaru | |
| 6,405,271 B1 * | 6/2002 | MacWilliams et al. | 710/109 |
| 6,519,685 B1 * | 2/2003 | Chang | 711/141 |
| 6,523,093 B1 * | 2/2003 | Bogin et al. | 711/137 |
| 6,542,982 B2 | 4/2003 | Murakami et al. | |
| 6,587,925 B2 * | 7/2003 | Arimilli et al. | 711/122 |
| 6,807,592 B2 * | 10/2004 | Singh et al. | 710/107 |
| 6,895,456 B2 | 5/2005 | Olarig et al. | |
| 6,963,954 B1 | 11/2005 | Trehus et al. | |
| 2002/0065967 A1 * | 5/2002 | MacWilliams et al. | 710/105 |
| 2003/0233531 A1 | 12/2003 | Lin | |

* cited by examiner

*Primary Examiner*—Eric Coleman
(74) *Attorney, Agent, or Firm*—Winston Hsu

(57) ABSTRACT

In a method for fetching instructions in an embedded system, a predicted one of a set of the instructions stored in a memory device is fetched and is subsequently stored in an instruction buffer when a system bus is in a data access phase. When a processor generates an access request for the memory device, the predicted one of the instructions stored in the instruction buffer is provided to the system bus for receipt by the processor upon determining that the predicted one of the instructions stored in the instruction buffer hits the access request from the processor. An embedded system with an instruction prefetching device is also disclosed.

20 Claims, 5 Drawing Sheets

EMBEDDED SYSTEM WITH INSTRUCTION PREFETCHING DEVICE, AND METHOD FOR FETCHING INSTRUCTIONS IN EMBEDDED SYSTEMS

CROSS REFERENCE TO RELATED APPLICATIONS

This continuation-in-part application claims the benefit of U.S. application Ser. No. 10/458,470, which was filed on Jun. 10, 2003, and entitled "EMBEDDED SYSTEM WITH INSTRUCTION PREFETCHING DEVICE, AND METHOD FOR FETCHING INSTRUCTIONS IN EMBEDDED SYSTEMS", and is included herein by reference.

BACKGROUND

The invention relates to an embedded system, more particularly to an embedded system with an instruction prefetching device and to a method for fetching instructions in embedded systems.

FIG. 1 illustrates a conventional embedded system 5 that comprises a system bus 54, a processor 51 coupled to the system bus 54, a memory controller 52 coupled to the system bus 54, a peripheral controller 53 coupled to the system bus 54, and a memory device 55 coupled to the memory controller 52. The peripheral controller 53 may be various controllers or drivers coupled to the system bus 54 and can be controlled by the processor 51. For example, in a cellular phone applications, the peripheral controller 53 may be a controller to control the LCD or a controller to control the keypad of a cellular phone. Rather than being coupled to the system bus 54 directly, in this example the memory device 55 is coupled to the memory controller 52 for being controlled and being accessed by the memory controller 52.

When the processor 51 wants to fetch instruction from the memory device 55, the processor 51 will issue an access request having a target address directed to the memory controller 52. The memory controller 52 then fetches an instruction from the memory device 55 according to the access request received from the processor 51, and provides the instruction to the system bus 54 for receipt by the processor 51. When the processor 51 is accessing the memory device 55, the system bus 54 will be occupied since it has to relay the access requests issued by the processor 51 to the memory controller 52 and relay the fetched instructions from the memory controller 52 to the processor 51.

Aside from accessing the memory device 55, the processor 51 can also access the peripheral controller 53. When the processor 51 wants to access the peripheral controller 53, the processor 51 will issue an access request having a target address directed to the peripheral controller 53. Apparently, when the processor 51 is accessing the peripheral controller 53, the system bus 54 will be occupied since it has to relay the access requests and information corresponding to the access requests between the processor 51 and the peripheral controller 53.

Besides, the peripheral controller 53 and another peripheral controller (not shown) can also exchange information through the system bus 54, causing the system bus 54 to be occupied by the two peripheral controllers.

Although the conventional embedded system has a lower system performance, it works well in various applications. However, as the embedded system 5 becomes more complex, the embedded system 5 is required to run at higher speeds to achieve better performance. More particularly, access latency occurs during fetching of an instruction from the memory device 55 after the processor 51 sent out an access request (i.e., fetching cycle), so the performance of the processor 51 is degraded. For the conventional embedded system, the fetching cycle occupies approximately 30%~50% of the instruction cycle of the processor 51, so access latency is a problem which cannot be ignored.

Two methods are proposed in the related art in order to overcome the above problem.

1. An additional cache memory (L2 cache) is incorporated to increase the memory bandwidth, so as to enhance the performance of the embedded system. However, the cache memory (such as an SRAM) has a higher cost and a relatively small memory capacity.

2. When the processor 51 executes an instruction, fetching of a next instruction is executed at the same time. This kind of solution is referred to as instruction prefetching. However, the occupation period of the system bus 54 becomes longer when the next instruction is among a series of consecutive instructions or has too many branch instructions. Data access to or from the peripheral controller 53 must wait until fetching of the next instruction has been completed by the processor 51. Similarly, when two peripheral controllers 53 are exchanging information, the processor 51 also have to wait a period for the system bus 54 to be freed.

In other words, as long as the system bus 54 is occupied, other information access processes relying on the system bus 54 have to wait until the system bus 54 is freed. FIG. 2 is a timing chart to illustrate an operating example of the conventional embedded system 5. The system bus 54 is occupied by the instruction fetch phase and the data access phase in turns. In the instruction fetch phase, the processor 51 communicates with the memory controller 52 and instructions or data stored in the memory device 55 are fetched; whereas in the data access phase, the processor 51 communicates with the peripheral controller 53 and requests the peripheral controller 53 to perform certain actions. Alternately, in the data access phase, the peripheral controller 53 is communicating with another peripheral controller (not shown) through the system bus 54. As such, when the system bus 54 is in the data access phase while one peripheral controller 53 is communicating with another peripheral controller 53, the processor 51 have to remain idle for a period of time (about two bus cycles) before it is allowed to communicate with the memory controller 52.

In addition, when the system bus 54 is occupied since the processor 51 is accessing the peripheral controller 53 or two peripheral controllers 53 are exchanging information, even if the memory controller 52 is idle the processor 51 still have to wait for a period of time (about two bus cycles) before it is allowed to communicate with the memory controller 52. Therefore, it is preferred that the memory controller 52 prefetches instructions from the memory device 55 while the system bus 54 is occupied by the processor 51 and the peripheral controller 53 or by two peripheral controllers. After the system bus 54 is freed, the memory controller 52 can send the prefetched instructions, which conform to the requirements of the processor 51, to the processor 51 in response to the request issued by the processor 51. The performance of the whole embedded system is therefore increased. An objective of the present invention is to propose a solution to this kind of problem.

SUMMARY

Therefore, the object of the present invention is to provide an instruction prefetching device and a method for prefetching instructions. The disclosed device and method allow a memory controller to prefetch instructions from a memory device. Even if the memory device is not a cache memory, the efficiency of fetching instructions is still increased greatly.

According to one aspect of the present invention, there is provided a method for fetching instructions in an embedded system that includes a system bus, a processor coupled to the system bus, a peripheral controller coupled to the system bus, and a memory device having a set of the instructions stored therein. The method comprises the steps of:

a) determining whether the system bus is in the data access phase;

b) fetching a predicted one of the instructions from the memory device, and storing the predicted one of the instructions in an instruction buffer when the system bus is in the data access phase;

c) determining whether the processor generates an access request for the memory device;

d) determining whether the predicted one of the instructions stored in the instruction buffer hits the access request from the processor upon determining that the processor generated the access request; and e) providing the predicted one of the instructions stored in the instruction buffer to the system bus for receipt by the processor when the predicted one of the instructions stored in the instruction buffer hits the access request from the processor.

According to another aspect of the present invention, an embedded system comprises:

a system bus for signaling and data transactions;

a processor coupled to the system bus;

a peripheral controller coupled to the system bus;

a memory device having a set of instructions stored therein; and an instruction prefetching device coupled to the system bus and the memory device, the instruction prefetching device monitoring signal transaction on the system bus and fetching a predicted one of the instructions from the memory device when the system bus is in the data access phase, the instruction prefetching device receiving an access request for the memory device from the processor through the system bus, and providing the predicted one of the instructions to the system bus for receipt by the processor when the predicted one of the instructions hits the access request from the processor.

According to still another aspect of the present invention, an instruction prefetching device is adapted for use in an embedded system that includes a system bus, a processor coupled to the system bus, a peripheral controller coupled to the system bus, and a memory device having a set of instructions stored therein. The instruction prefetching device comprises:

a prefetching controller coupled to the system bus and adapted to monitor transaction on the system bus;

a memory controller coupled to the prefetching controller and the memory device; and an instruction buffer coupled to the prefetching controller and the memory controller;

the prefetching controller enabling the memory controller to fetch a predicted one of the instructions from the memory device and to store the predicted one of the instructions in the instruction buffer when the prefetching controller determines that the system bus is in the data access phase;

the prefetching controller being adapted to receive an access request for the memory device from the processor through the system bus when the system bus is not in the data access phase, and being adapted to provide the predicted one of the instructions stored in the instruction buffer to the processor through the system bus when the predicted one of the instructions stored in the instruction buffer hits the access request from the processor.

BRIEF DESCRIPTION OF THE DRAWINGS

Other features and advantages of the present invention will be come apparent in the following detailed description of the preferred embodiment with reference to the accompanying drawings, of which.

DETAILED DESCRIPTION

Figure 3:
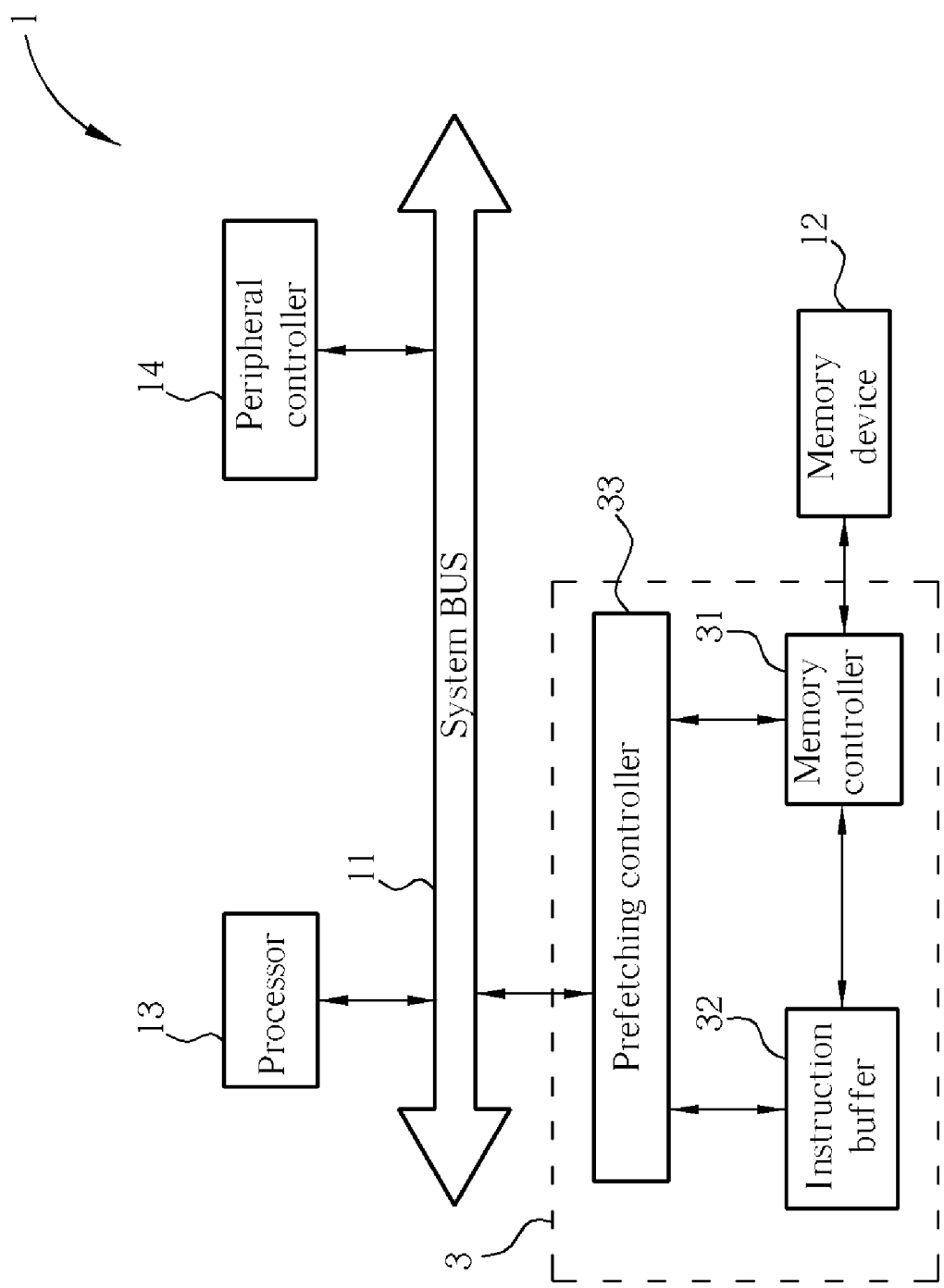
FIG. 3 is a schematic circuit block diagram illustrating the preferred embodiment of an embedded system according to the present invention.

Referring to FIG. 3, the preferred embodiment of an embedded system 1 according to the present invention is shown to include a system bus 11, a processor 13, a peripheral controller 14, a memory device 12, and an instruction prefetching device 3.

The system bus 11 is used for signaling and data transactions. As known to those skilled in the art, the system bus 11 may include an address bus, a control bus, and a data bus, etc.

The processor 13 is coupled to the system bus 11 for controlling communication and data transmission within the embedded system 1 or with other external devices (not shown). The processor 13 may further comprise a cache memory (not shown).

The peripheral controller 14 is coupled to the system bus 11. In a cellular phone or other handheld systems, the peripheral controller 14 may be a controller to control a peripheral device, such as an LCD display, a keypad, an IR (intra-red) device, or a USB (Universal Serial Bus) device.

The memory device 12 has a set of instructions or data stored therein. In this embodiment, the memory device 12 may be an internal memory located inside the embedded system, or an external memory located outside the embedded system. The memory device 12 may be a ROM, FLASH, SRAM, DRAM or similar electronic devices for storing instructions of the processor 13.

The instruction prefetching device 3 is coupled to the system bus 11 and the memory device 12 and serves as an interface for transmission and control between the processor 13 and the memory device 12. The instruction prefetching device 3 monitors signal transaction on the system bus 11 and controls a memory controller 31 to fetch or to prefetch instruction from the memory device 12. More specifically, when the system bus 11 is in the data access phase, the instruction prefetching device 3 prefetches a predicted one of the instructions from the memory device 12. The instruction prefetching device 3 receives an access request for the memory device 12 from the processor 13 through the system bus 11, and provides the predicted one of the instructions to the system bus 11 for receipt by the processor 13 when the predicted one of the instructions hits the access request from the processor 13.

In this embodiment, the instruction prefetching device 3 includes a prefetching controller 33 coupled to the system bus 11 for monitoring signal transaction on the system bus 11, a memory controller 31 coupled to the memory device 12 and the prefetching controller 33, and an instruction buffer 32 coupled to the prefetching controller 33 and the memory controller 31. The prefetching controller 33 enables the memory controller 31 to fetch or prefetch instructions from the memory device 12. More specifically, the prefetching controller 33 enables the memory controller 31 to either fetch instruction, which is currently requested by the processor 13, from the memory device 12, or prefetch instruction, which is predicted to be requested by the processor 13, from the memory device 12. The instructions fetched (or prefetched) by the memory controller 31 are stored in the instruction buffer 32. If the processor 13 is performing a loop function and repeating executing a single instruction, the prefetching controller 33 can send the instruction stored in the instruction buffer 32 to the processor 13 directly without fetching the instruction from the memory device 12 repeatedly.

The system bus 11 is in the data access phase when the processor 13 is accessing the peripheral controller 14 through the system bus 11, or when the peripheral controller 14 is communicating with another peripheral controller (not shown) through the system bus 11. When the prefetching controller 33 determines that the system bus 11 is in the data access phase, the prefetching controller 33 enables the memory controller 31 to prefetch a predicted one of the instructions from the memory device 12 and to store the predicted one of the instructions in the instruction buffer 32. The prefetching controller 33 receives an access request from the processor 13 through the system bus 11 when the system bus 11 is in the instruction fetching phase, and provides a predicted one of the instructions stored in the instruction buffer 32 to the processor 13 through the system bus 11 when the predicted one of the instructions stored in the instruction buffer 32 hits the access request from the processor 13. It is noted that the predicted one of the instructions is determined by the prefetching controller 33 according to a previous instruction from the memory device 12 that was accessed by the processor 13.

The prefetching controller 33 determines whether instruction prefetching is allowed or not through monitoring the target address of signal transmitted through the system bus 11. When the prefetching controller 33 finds that the target address of signal transmitted through the system bus 11 points to the peripheral controller 14 or another peripheral controller, the prefetching controller 33 can determine that the system bus 11 is occupied and the memory controller 31 is in an idle status. In other words, the prefetching controller 33 determines that the system bus 11 is in the data access phase when the prefetching controller 33 finds that the target address of signal transmitted through the system bus 11 points to the peripheral controller 14 or another peripheral controller. The prefetching controller 33 can then enable the memory controller 31 to prefetch instructions from the memory device 12. If, on the other hand, the prefetching controller 33 finds that the target address of signal transmitted through the system bus 11 points to the prefetching controller 33 itself, the prefetching controller 33 can determine that the system bus 11 is occupied due to instruction fetching and the memory controller 31 is responsible for providing currently requested instructions to the processor 13. Therefore the prefetching controller 33 may not be allowed to enable the memory controller 31 to prefetch instructions from the memory device 12.

In other words, the prefetching controller 33 is allowed to enable the memory controller 31 to prefetch instructions from the memory device 12 when the system bus 11 is in the data access phase and the memory controller 31 is in the idle status.

Figure 4:
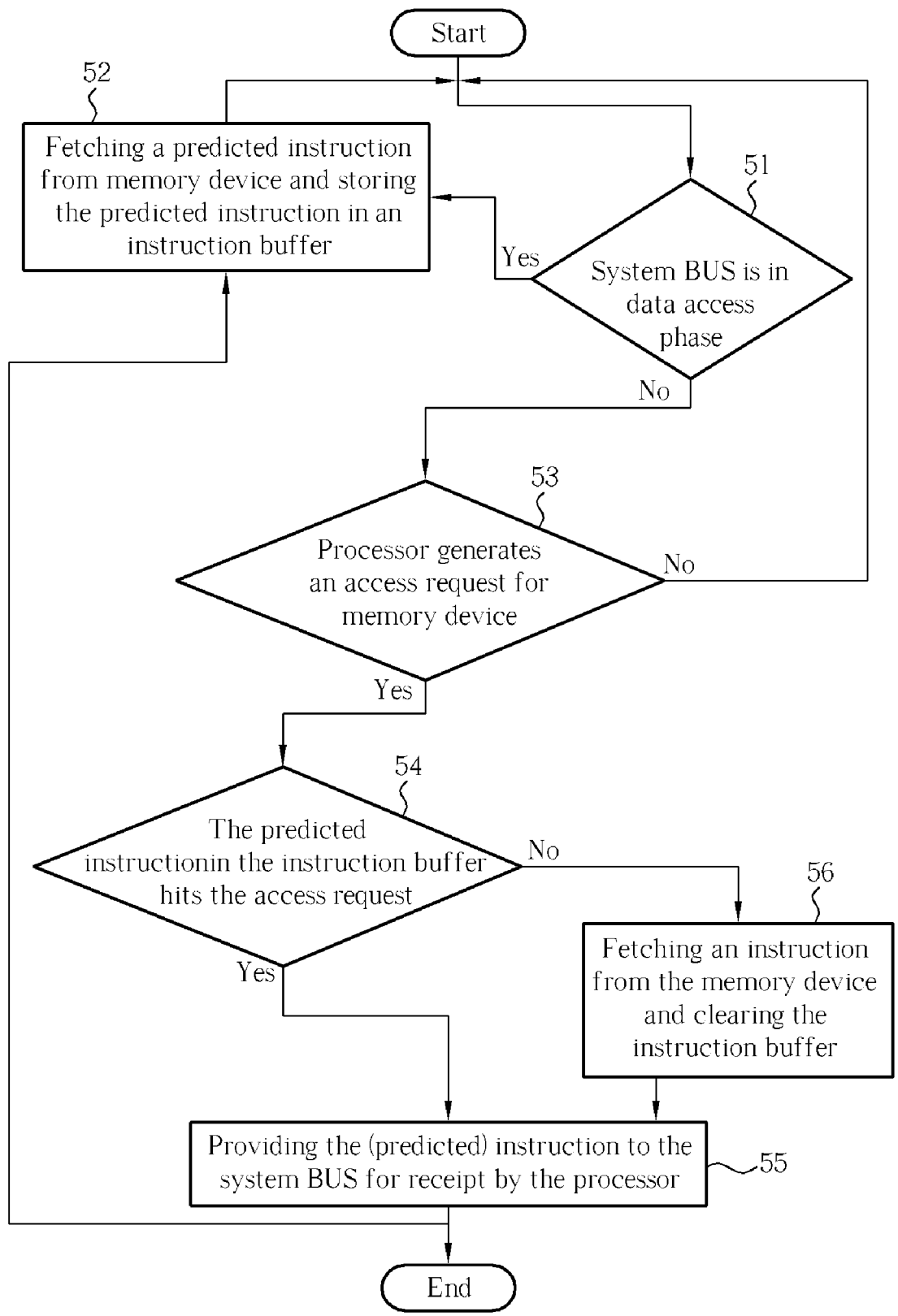
FIG. 4 is a flow chart illustrating a method for fetching instructions in the preferred embodiment.

Referring to FIG. 4, there is shown a flow chart to illustrate how the instruction prefetching device 3 fetches instructions in the embedded system 1 of the preferred embodiment. In step 51, when a transaction is started on the system bus 11, the prefetching controller 33 determines whether the system bus 11 is in the data access phase. More specifically, the prefetching controller 33 examines the target address of the transaction on the system bus 11 so as to determine whether the system bus 11 is in the data access phase or not. If the target address of the transaction on the system bus 11 does not point to the prefetching controller 33, the prefetching controller 33 determines that the system bus 11 is in the data access phase and step 52 will be performed next. If, on the other hand, the target address of the transaction on the system bus 11 points to the prefetching controller 33 itself, the prefetching controller 33 determines that the system bus 11 is not in the data access phase and step 53 will be performed next.

As mentioned, if the target address of the transaction on the system bus 11 does not point to the prefetching controller 33, the prefetching controller 33 determines that the system bus 11 is in the data access phase and the memory controller is in the idle status. Therefore in step 52 the prefetching controller 33 enables the memory controller 31 to prefetch a predicted one of the instructions from the memory device 12 and to store the predicted one of the instructions into the instruction buffer 32, and the flow proceeds back to step 51. In view of sequential characteristics of the instructions executed by the processor 13, the predicted one of the instructions is determined by the prefetching controller 33 according to previous instructions from the memory device 12 that were accessed by the processor 13.

On the other hand, if the target address of the transaction on the system bus 11 points to the prefetching controller 33 itself, the prefetching controller 33 determines that the system bus 11 is not in the data access phase. Therefore in step 53, the prefetching controller 33 determines whether the processor 13 generates an access request for the memory device 12. When the processor 13 does not generate an access request for the memory device 12, the flow proceeds back to step 51. When the processor 13 does generate an access request for the memory device 12, the flow proceeds to step 54.

In step 54, the prefetching controller 33 determines whether the predicted one of the instructions stored in the instruction buffer 32 hits the access request from the processor 13 when the prefetching controller 33 receives the access request from the processor 13. If the predicted one of the instructions stored in the instruction buffer 32 hits the access request from the processor 13, the flow proceeds to step 55; otherwise, the flow proceeds to step 56.

In step 55, the prefetching controller 33 provides the predicted one of the instructions stored in the instruction buffer 32 to the system bus 11 for receipt by the processor 13 since the predicted one of the instructions stored in the instruction buffer 32 hits the access request from the processor 13.

On the other hand, in step 56, when the predicted one of the instructions stored in the instruction buffer 32 misses the access request from the processor 13, the prefetching controller 33 enables the memory controller 31 to fetch an instruction corresponding to the access request from the processor 13 from the memory device 12 according to an address signal from the processor 13. In addition, the prefetching controller 33 can further clear the instruction buffer 32 in step 56 so as to allow the instruction buffer 32 to store a next predicted one of the instructions stored in the memory device 12. Besides, even though only one instruction buffer 53 is shown in FIG. 3, the instruction prefetching device 3 can include a plurality of instruction buffers so as to allow a plurality of prefetched instruction to be stored. An advantage of setting a plurality of instruction buffers is that the prefetching controller 33 can clear the instruction buffers less frequently. More specifically, only when all the instruction buffers are occupied by prefetched instructions and a new prefetched instruction is going to be stored into one of the instruction buffers, the prefetching controller 33 performs the clear operation on one or all of the instruction buffers.

The flow then proceeds to step 55 such that the prefetching controller 33 provides the proper instruction from the memory device 12 to the system bus 11 for receipt by the processor 13.

Figure 1:
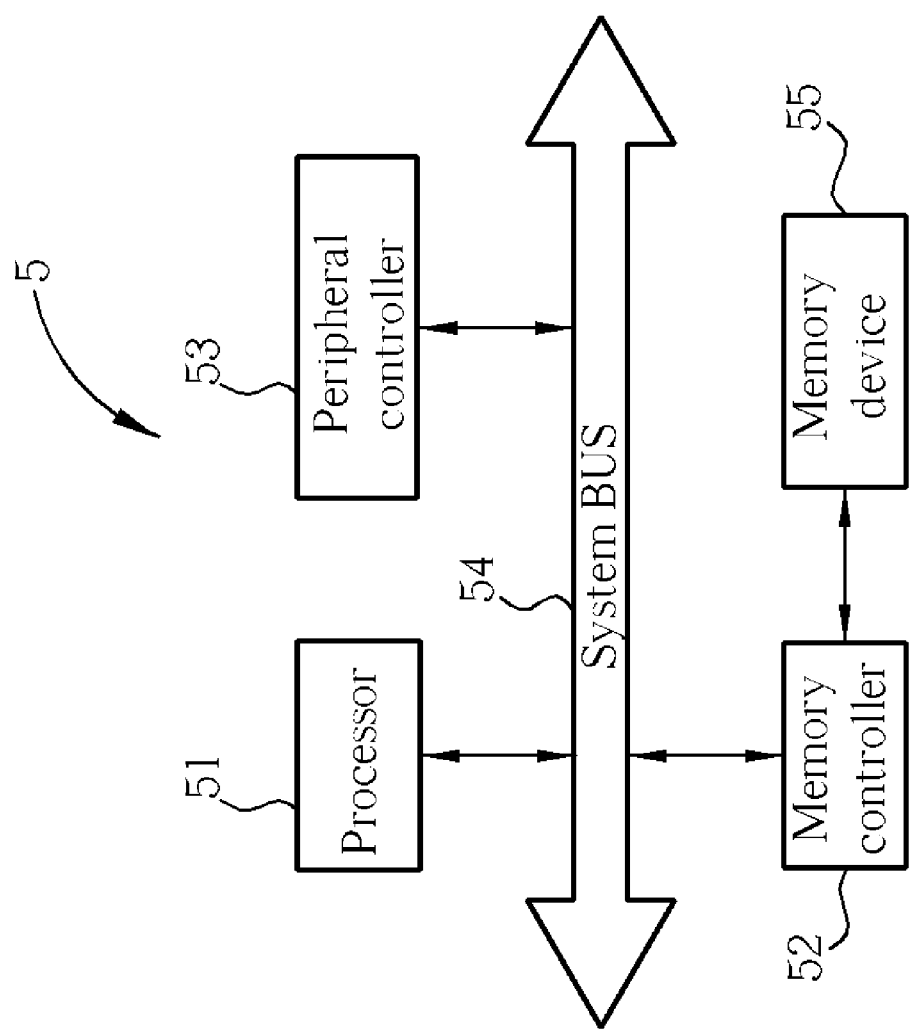
FIG. 1 is a schematic circuit block diagram illustrating a conventional embedded system.
Figure 2:
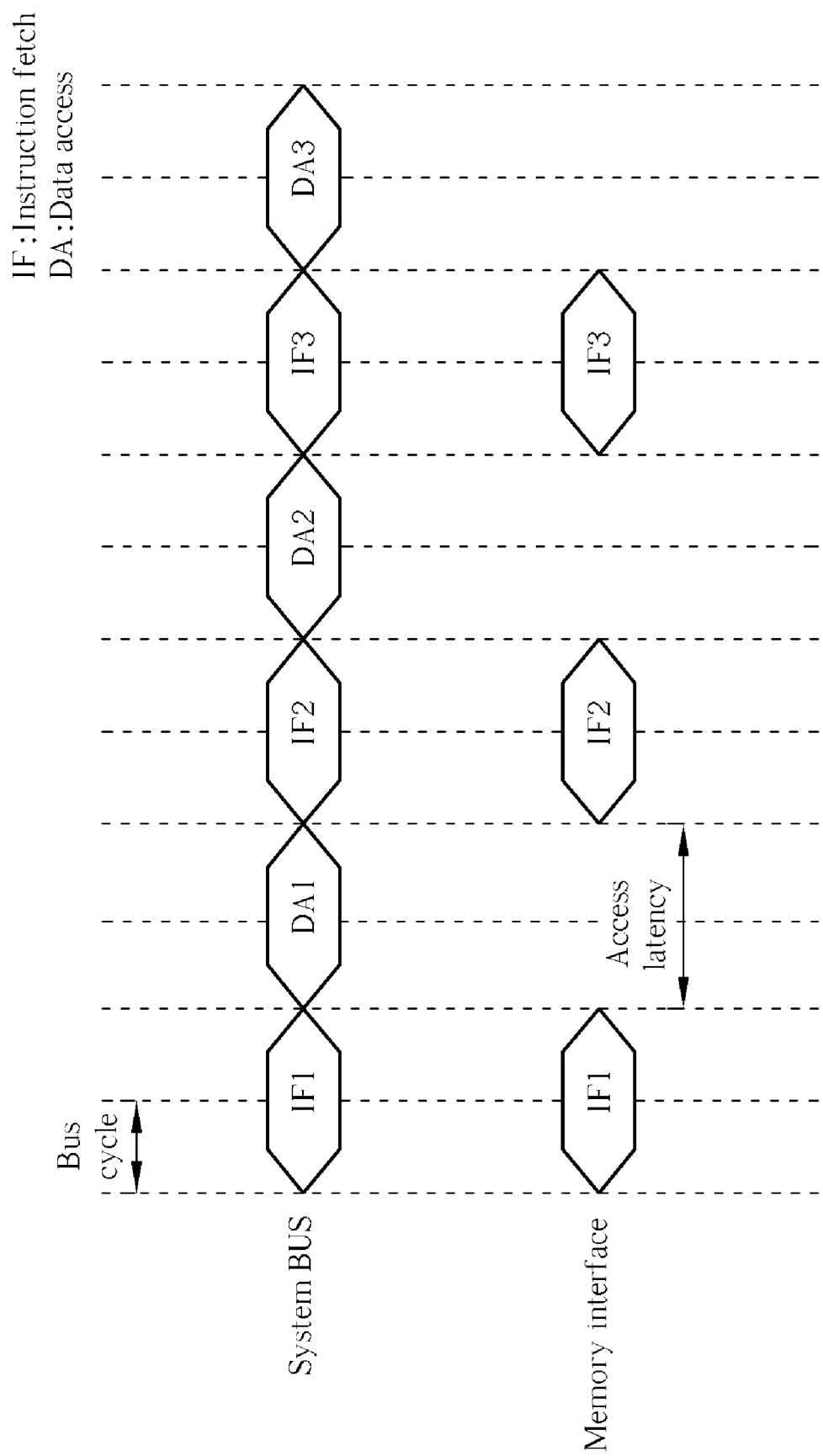
FIG. 2 is a timing chart showing an operating example of a system bus and a memory interface in the conventional embedded system.
Figure 5:
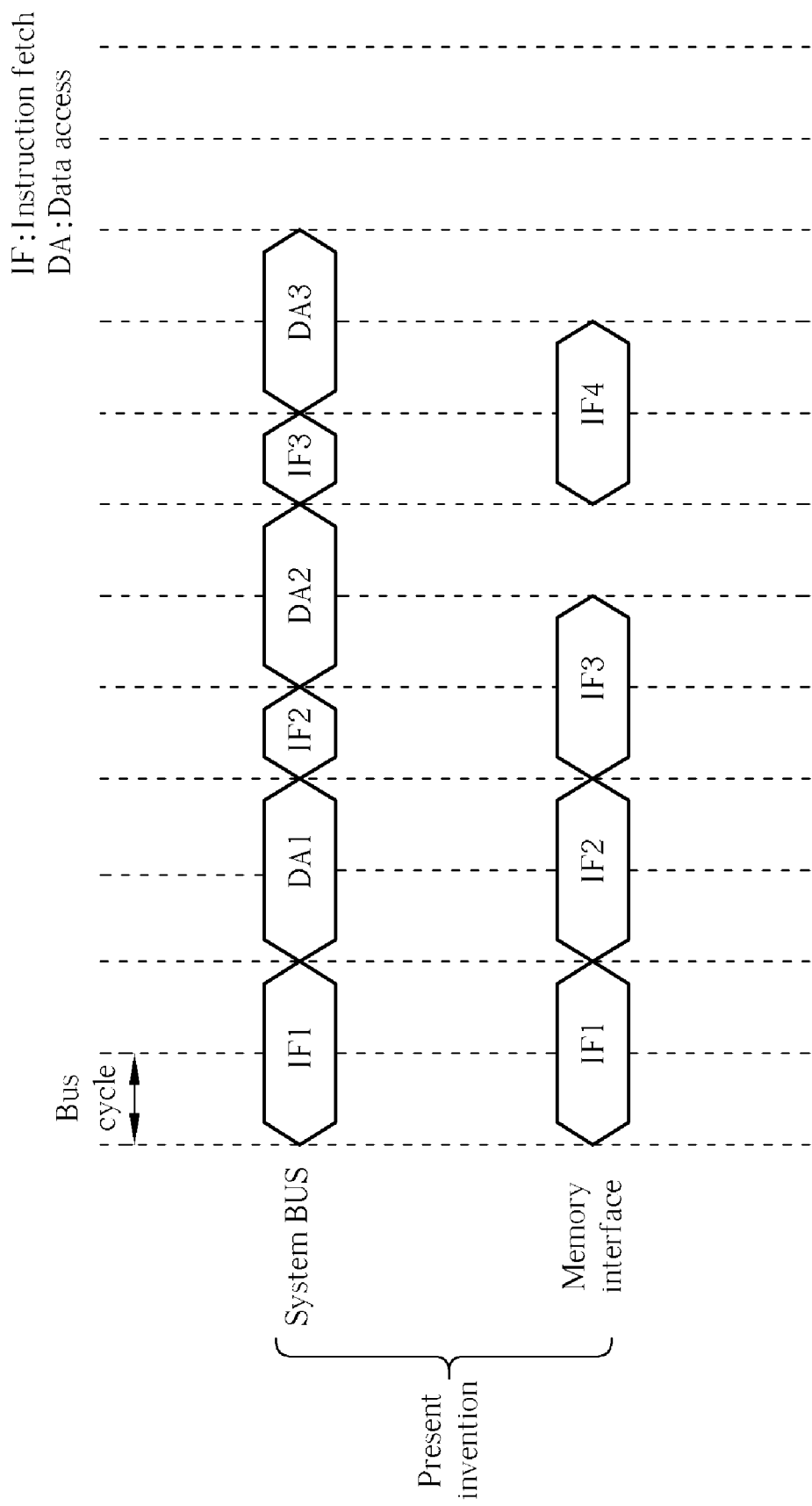
FIG. 5 is a timing chart showing an operating example of a system bus and a memory interface in the preferred embodiment.

Referring to FIG. 5, there is shown a timing chart of an operating example of the system bus 11 and a memory interface of the memory device 12. In this example, when the system bus 11 is in the data access phase (DA1), the prefetching controller 33 enables the memory controller 31 to fetch a predicted instruction (IF2) stored in the memory device 12 and to store the predicted instruction (IF2) in the instruction buffer 32 such that the prefetching controller 33 can provide the predicted instruction (IF2) stored in the instruction buffer 32 to the system bus 11 for receipt by the processor 13 upon receiving an access request of the predicted instruction (IF2) from the processor 13. Thus, only one bus cycle is needed for the processor 13 to fetch the predicted instruction (IF2) on the system bus 11. Meanwhile, when the predicted instruction (IF2) is sent to the processor 13 through the system bus 11, the prefetching controller 33 can perform prefetching of a next predicted instruction (IF3), simultaneously. Therefore, the efficiency of the system bus 11 can be improved, and the latency for fetching instructions by the processor 13 can be effectively shortened. For example, in the stage of data access (DA3), the embedded system 1 of the present invention has been advanced by about two bus cycles as compared to the timing chart of FIG. 2 for the aforesaid conventional embedded system.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An instruction prefetching device adapted for use in an embedded system that comprises a system bus, a processor coupled to the system bus, at least one peripheral controller coupled to the system bus, and a memory device, said instruction prefetching device comprising:

a memory controller coupled to said memory device for serving as an input/output interface of said instruction prefetching device and said memory device and for fetching an instruction from said memory device;

an instruction buffer coupled to said memory controller, for storing the instruction fetched by said memory controller; and a prefetching controller coupled to said system bus, for monitoring signal transaction on said system bus so as to determine whether said system bus is in a data access phase or not, wherein when said system bus is in the data access phase, the prefetching controller enables the memory controller to prefetch the instruction from said memory device and store the prefetched instruction into said instruction buffer without utilizing said system bus.

2. The instruction prefetching device as claimed in claim 1, wherein the prefetched instruction is predicted by said prefetching controller according to an instruction previously accessed by said processor.

3. The instruction prefetching device as claimed in claim 1, wherein said prefetching controller determines whether said system bus is in the data access phase or not through monitoring the target address of signal transmitted through said system bus.

4. The instruction prefetching device as claimed in claim 1, wherein when said processor requests an instruction to be fetched, said prefetching controller first determines whether the instruction stored in said instruction buffer hits the request of said processor; if the instruction stored in said instruction buffer hits the request of said processor, said prefetching controller directly fetched the instruction from said instruction buffer and then send the fetched instruction to said processor; and if the instruction stored in said instruction buffer does not hit the request of said processor, said prefetching controller controls said memory controller to fetch the requested instruction from said memory device and then send the fetched instruction to said processor.

5. An embedded system comprising:

a system bus for signaling and data transactions;

a processor coupled to said system bus;

a memory device; and an instruction prefetching device coupled to said system bus and said memory device, for monitoring signal transaction on said system bus so as to determine whether said system bus is in a data access phase or not, wherein when said system bus is in the data access phase, the instruction prefetching device prefetches an instruction from said memory device and store the prefetched instruction into the instruction prefetching device without utilizing said system bus.

6. The embedded system as claimed in claim 5, wherein said instruction prefetching device comprises:

a memory controller serving as an input/output interface of said instruction prefetching device and said memory device and for fetching the instruction from said memory device;

an instruction buffer for storing the instruction fetched by said memory controller; and a prefetching controller coupled to said system bus, for monitoring signal transaction on said system bus and for receiving requests from said processor through said system bus, wherein when said system bus is in the data access phase, the prefetching controller controls the memory controller to prefetch the instruction from said memory device and store the prefetched instruction into the instruction buffer.

7. The embedded system as claimed in claim 5, wherein the prefetched instruction is predicted by said instruction prefetching device according to an instruction previously accessed by said processor.

8. The embedded system as claimed in claim 5, wherein said instruction prefetching device determines whether said system bus is in the data access phase or not through monitoring the target address of signal transmitted through said system bus.

9. The embedded system as claimed in claim 5, wherein when said processor requests an instruction to be fetched, said instruction prefetching device first determines whether the instruction stored in said instruction prefetching device hits the request of said processor; if the instruction stored in said instruction prefetching device hits the request of said processor, said instruction prefetching device directly sends the instruction stored in said instruction prefetching device to said processor; and if the instruction stored in said instruction prefetching device does not hit the request of said processor, said instruction prefetching device fetches the requested instruction from said memory device and then send the fetched instruction to said processor.

10. A method for fetching instructions in an embedded system that comprises a system bus, a processor, a memory device, and an instruction fetching device, said method comprising the steps of:
   a) monitoring signal transaction on said system bus so as to determine whether said system bus is in a data access phase or not; and
   b) performing an instruction prefetching procedure without utilizing said system bus when said system bus is in the data access phase, and performing an instruction fetching procedure when said system bus is not in the data access phase.

11. The method as claimed in claim 10, wherein said instruction prefetching procedure comprises:
   predicting an instruction that will possibly be fetched in the future according to an instruction previously accessed by said processor;
   prefetching the predicted instruction from said memory device; and
   storing the prefetched instruction into said instruction fetching device.

12. The method as claimed in claim 10, wherein said instruction fetching procedure comprises:
   receiving an instruction fetching request from said processor;
   determining whether the instruction stored in said instruction fetching device hits the instruction fetching request received from said processor;
   if the instruction stored in said instruction fetching device hits the instruction fetching request received from said processor, directly sending the stored instruction to said processor; and
   if the instruction stored in said instruction fetching device misses the instruction fetching request received from said processor, fetching the requested instruction from said memory device according to the instruction fetching request received from said processor, and then sending the fetched instruction to said processor.

13. The method as claimed in claim 10, wherein whether said system bus is in the data access phase or not is determined through monitoring the target address of signal transaction on said system bus.

14. The method as claimed in claim 10, wherein when said processor requests an instruction to be fetched, the instruction fetching device performs a determining procedure, and said determining procedure comprises:
   determining whether the instruction stored in said instruction fetching device hits the request of said processor;
   if the instruction stored in said instruction fetching device hits the request of said processor, directly sending the stored instruction to said processor; and
   if the instruction stored in said instruction fetching device misses the request of said processor, fetching the requested instruction from said memory device according to the request of said processor, and then sending the fetched instruction to said processor.

15. An instruction prefetching device adapted for use in an embedded system that comprises a system bus, a processor coupled to the system bus, at least one peripheral controller coupled to the system bus, and a memory device, said instruction prefetching device comprising:
   a memory controller coupled to said memory device for serving as an input/output interface of said instruction prefetching device and said memory device and for fetching an instruction from said memory device;
   an instruction buffer coupled to said memory controller, for storing the instruction fetched by said memory controller; and
   a prefetching controller coupled to said system bus, for monitoring signal transaction on said system bus so as to determine whether said system bus is in a data access phase or not, wherein said prefetching controller determines whether said system bus is in the data access phase or not through monitoring the target address of signal transmitted through said system bus, and when said system bus is in the data access phase, the prefetching controller enables the memory controller to prefetch the instruction from said memory device and store the prefetched instruction into said instruction buffer.

16. An embedded system comprising:
a system bus for signaling and data transactions;
a processor coupled to said system bus;
a memory device; and
an instruction prefetching device coupled to said system bus and said memory device, for monitoring signal transaction on said system bus so as to determine whether said system bus is in a data access phase or not, wherein said instruction prefetching device determines whether said system bus is in the data access phase or not through monitoring the target address of signal transmitted through said system bus, and when said system bus is in the data access phase, the instruction prefetching device prefetches an instruction from said memory device and store the prefetched instruction into the instruction prefetching device.

17. A method for fetching instructions in an embedded system that comprises a system bus, a processor, and a memory device, said method comprising:
   a) monitoring signal transaction on said system bus so as to determine whether said system bus is in a data access phase or not; and
   b) performing an instruction prefetching procedure when said system bus is in the data access phase, and performing an instruction fetching procedure when said system bus is not in the data access phase;
   wherein whether said system bus is in the data access phase or not is determined through monitoring the target address of signal transaction on said system bus.

18. An instruction prefetching device adapted for use in an embedded system that comprises a system bus, a processor coupled to the system bus, at least one peripheral controller coupled to the system bus, and a memory device, said instruction prefetching device comprising:
- a memory controller coupled to said memory device for serving as an input/output interface of said instruction prefetching device and said memory device and for fetching an instruction from said memory device;
- an instruction buffer coupled to said memory controller, for storing the instruction fetched by said memory controller; and
- a prefetching controller coupled to said system bus, for monitoring signal transaction on said system bus so as to determine whether said memory controller is idle while said system bus is occupied, wherein when said memory controller is idle and said system bus is occupied, the prefetching controller enables the memory controller to prefetch the instruction from said memory device and store the prefetched instruction into said instruction buffer.

19. An embedded system comprising:
a system bus for signaling and data transactions;
a processor coupled to said system bus;
a memory device; and
an instruction prefetching device coupled to said system bus and said memory device, for monitoring signal transaction on said system bus so as to determine whether said memory controller is idle while said system bus is occupied, wherein when said memory controller is idle and said system bus is occupied, the instruction prefetching device prefetches an instruction from said memory device and store the prefetched instruction into the instruction prefetching device.

20. A method for fetching instructions in an embedded system that comprises a system bus, a processor, a memory device, and a memory controller, said method comprising:
a) monitoring signal transaction on said system bus so as to determine whether said memory controller is idle while said system bus is occupied; and
b) performing an instruction prefetching procedure when it is determined that said memory controller is idle while said system bus is occupied, and performing an instruction fetching procedure when said memory controller is not idle and said system bus is occupied.

* * * * *